(12) United States Patent
Rezek et al.

(10) Patent No.: US 12,253,538 B2
(45) Date of Patent: **\*Mar. 18, 2025**

(54) METHOD OF EXAMINING A SAMPLE IN A SCANNING TUNNELING MICROSCOPE USING TIP-TO-SAMPLE DISTANCE VARIATIONS

(71) Applicant: CESKE VYSOKE UCENI TECHNICKE V PRAZE, Prague (CZ)

(72) Inventors: Bohuslav Rezek, Prague (CZ); Egor Ukraintsev, Kladno (CZ)

(73) Assignee: CESKE VYSOKE UCENI TECHNICKE V PRAZE, Prague (CZ)

( * ) Notice: Subject to any disclaimer, the term of this patent is extended or adjusted under 35 U.S.C. 154(b) by 0 days.

This patent is subject to a terminal disclaimer.

(21) Appl. No.: 18/010,534

(22) PCT Filed: Jul. 13, 2021

(86) PCT No.: PCT/CZ2021/050077
§ 371 (c)(1),
(2) Date: Dec. 15, 2022

(87) PCT Pub. No.: WO2022/258085
PCT Pub. Date: Dec. 15, 2022

(65) Prior Publication Data
US 2024/0264198 A1 Aug. 8, 2024

(51) Int. Cl.
*G01Q 10/00* (2010.01)
*G01Q 60/04* (2010.01)
*G01Q 60/10* (2010.01)

(52) U.S. Cl.
CPC ............ *G01Q 10/00* (2013.01); *G01Q 60/04* (2013.01); *G01Q 60/10* (2013.01)

(58) Field of Classification Search
CPC ...... G01Q 10/065; G01Q 10/00; G01Q 60/04; G01Q 60/10
See application file for complete search history.

(56) References Cited

U.S. PATENT DOCUMENTS

| 4,343,993 A | 8/1982 | Binnig et al. |
| 4,724,318 A | 2/1988 | Binnig |
| (Continued) | | |

FOREIGN PATENT DOCUMENTS

| EP | 0449221 A2 | 10/1991 |
| RU | 2109369 C1 | 4/1998 |
| WO | 9615423 A1 | 5/1996 |

OTHER PUBLICATIONS

International Search Report (Apr. 19, 2022) for corresponding International App. PCT/CZ2021/050077.

*Primary Examiner* — Nicole M Ippolito
(74) *Attorney, Agent, or Firm* — WRB-IP PLLC

(57) ABSTRACT

A method of examining a sample (1) in a microscope equipped with at least one scanning tunneling tip (4), wherein tunneling current TC can be detected and wherein relative tip-to-sample planar coordinates xrel=xtip−xsample and yrel=ytip−ysample are differences between corresponding tip and sample coordinates, wherein the following steps are performed above at least two surface points of the sample (1): placing the tip (4) successively above said surface points of the sample (1); above each of said surface points of the sample, performing a distance varying step (33) comprising varying the tip-to-sample distance D, and performing a time dependencies recording step (35), comprising recording time dependencies TC(t), xrel(t), yrel(t), D(t). Based on these time dependencies, four maps can be created from a single measurement: constant current map, constant height map, Local Density of States Topography map and potential barrier map.

18 Claims, 10 Drawing Sheets

(56) References Cited

U.S. PATENT DOCUMENTS

| | | | |
|---|---|---|---|
| 5,283,437 | A | 2/1994 | Greschner et al. |
| 6,831,531 | B1 | 12/2004 | Giousouf et al. |
| 7,391,022 | B2 | 6/2008 | Ohta |
| 2014/0366228 | A1 | 12/2014 | Williams et al. |
| 2024/0264199 | A1* | 8/2024 | Ukraintsev .......... G01Q 10/065 |

* cited by examiner

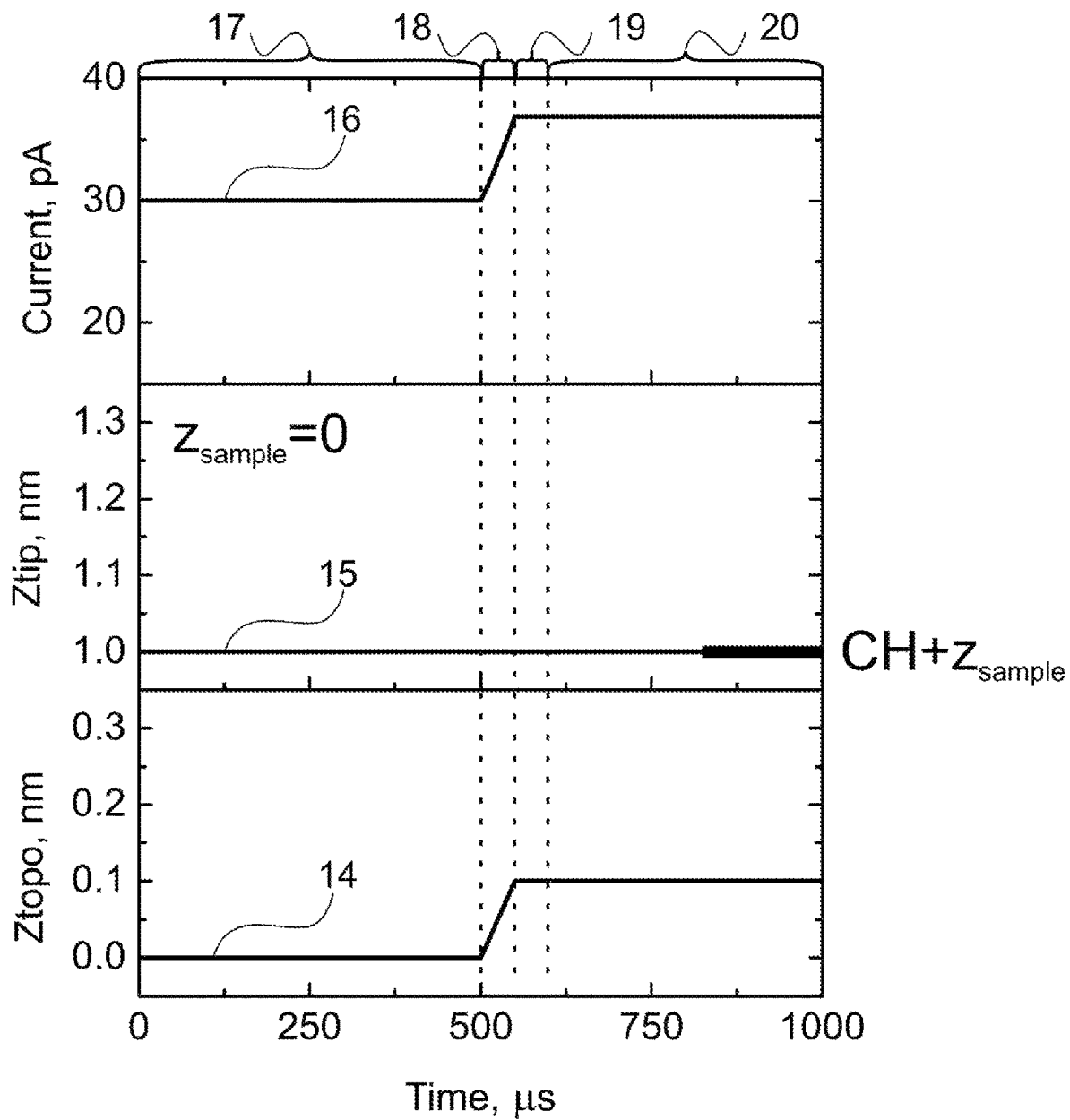
Fig.1a (State of the art)
Constant current method.

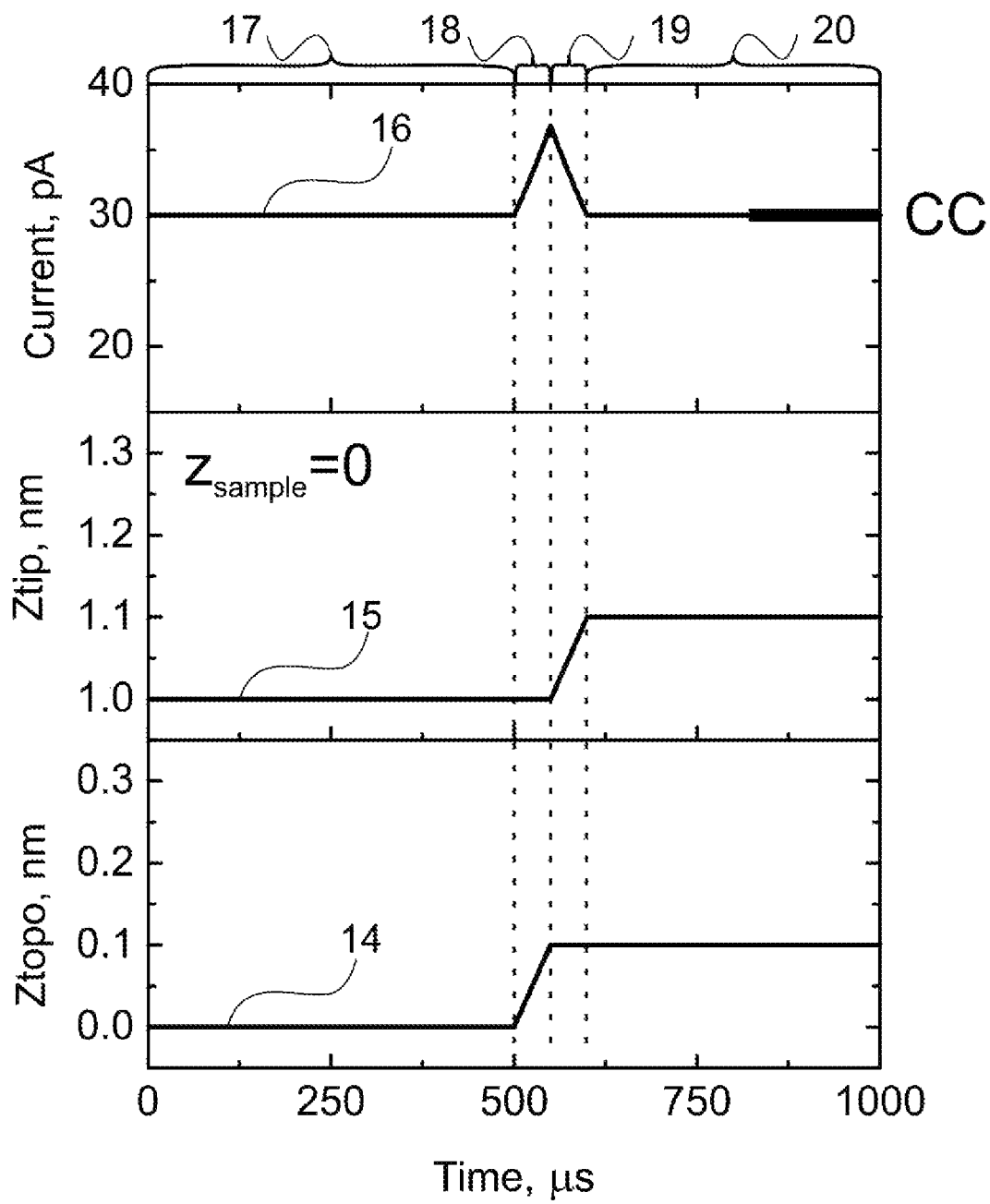
Fig.1b (State of the art)
Constant height method.

METHOD OF EXAMINING A SAMPLE IN A SCANNING TUNNELING MICROSCOPE USING TIP-TO-SAMPLE DISTANCE VARIATIONS

BACKGROUND AND SUMMARY

The present invention relates to simultaneous constant height and constant current measurements which can be typically performed in a scanning tunneling microscope (STM) or in a combined atomic force microscope/scanning tunneling microscope (AFM/STM) microscope. Simultaneous Local Density of States Topography and potential barrier measurements in these microscopes are also disclosed.

Large variety of scanning probe microscopy (SPM) techniques are used nowadays to study surface properties. Different Atomic force Microscopy (AFM) methods use Si probes to probe surface topography, stiffness and adhesion properties in contact and non-contact regimes. In an STM, tunneling current is used to get information about electronic structure of the sample. Additional direct current (DC) and alternative current (AC) oscillations are used in scanning tunneling spectroscopy (STS) to detect the Local Density of States (LDOS), potential barriers and band gap of samples at the atomic scale. Combination of AFM and STM techniques by decorating of qPlus sensor probe with C—O group allows even more local measurements with extremely sharp single atom probe.

Since the invention of STM (see e. g. Binnig et al., Scanning tunneling microscopy, IBM Journal of Research and Development, 30 4: 355-69, 1986, further noted as Binning 1, or the patent publication U.S. Pat. No. 4,343,993) and since the invention of AFM (see e. g. Binnig et al., Atomic Force Microscope, Phys. Rev. Lett. 56, 930, 1986, or the patent publication U.S. Pat. No. 4,724,318) several different approaches to obtain higher resolution maps with higher signal to noise ratio were tested: tuning fork disclosed in a patent document KR 100896880, tuning fork with qPlus sensor (see Giessibl et al., Stability considerations and implementation of cantilevers allowing dynamic force microscopy with optimal resolution: The qPlus sensor, Nanotechnology, Volume 15, Issue 2, Pages S79-S86, February 2004), and qPlus sensor decorated with C—O group (see Hapala et al., Mechanism of high-resolution STM/AFM imaging with functionalized tips, Physical Review B—Condensed Matter and Materials Physics Volume 90, Issue 8, Article number, 19 Aug. 2014). Nowadays many inventions are related to the combination of AFM and STM in which the current is measured during AFM measurements, as disclosed e. g. in RU 2109369.

Many patents are related to XYZ actuators. For example, several solutions for fine and coarse movement of probe and sample were introduced, see U.S. Pat. No. 4,999,495. Capacitive transducer with electrostatic actuation can be used too, as disclosed in EP 0792437. Pneumatically and electrostatically driven scanning tunneling microscope introduces another method for XYZ actuator, see e. g. U.S. Pat. No. 5,283,437. To preserve linearity of measurements and remain high resolution both sample and probe can be moved is all direction (x, y, z), see e. g. U.S. Pat. No. 7,391,022. Those methods can be useful for performing probe oscillations at small amplitude with high frequency.

In standard STM the sample is not oscillating under the tip, as it can be gleaned from Binning 1 and U.S. Pat. No. 4,343,993. Therefore, either constant height or constant current image can be obtained in one measurement. For the time being, there is no solution for obtaining constant height and constant current measurements during single measurement. In combination of AFM and STM which is disclosed in RU 2109369, the probe is oscillating above the sample, but only the oscillation amplitude is considered and used as feedback signal, the high frequency current signal, which could be used to reconstruct constant height and constant current maps, is not recorded.

To sum up, in standard STM or AFM/STM measurements the recorded topographical information is obtained either in the constant current mode (current value is used as a feedback to follow the surface topography) or in the constant height mode (the probe is floating above the surface at fixed averaged distance and tunneling current is recorded). Up till now, there is no method which would allow to perform constant current and constant height measurements simultaneously. Similarly, the state-of-art methods allow to probe LDOS by varying the voltage between tip and sample, but do not allow to perform the Local Density of States Topography (LDOST) and potential barrier measurements by varying the distance between the tip and the sample. Consequently, there is no state-of-art method to get all four sets of data from one measurement, i. e. to get the constant current data, the constant height data, LDOST data and potential barrier data from a single measurement.

Important advantage of this method is avoidance of possible constant current (CC) map artifact. CC map, obtained for surface atoms with the same $z_{topo}$ coordinates but with different potential barriers will have variations in height, which is an STM artifact. LDOST map will not have those variations as the potential barrier φ and surface height SH are independently determined by fitting the measured dependency TC(D) by equation 1.

The drawback of known methods is clear: the necessity to repeat the measurements to get each set of data, i. e. two measurements are necessary to get the constant current data and the constant height data. Such repeated procedure, when the sample has to be scanned several times, is time demanding. Moreover, it may lead to loss of precision in the sample/tip position data corresponding to different measurements, so that the sets of data corresponding to each scan cannot be matched with exactitude, etc.

It is desirable to provide a method which allows to get the constant current and the constant height data from a single measurement, and even more, to get also the LDOST and the potential barrier data from that same measurement, i. e. from a single scan of the sample. Consequently, the constant current map, the constant height map, the LDOST map and the potential barrier map can be reconstructed from a single scan of the sample.

The method of examining a sample in a microscope equipped with at least one scanning tunneling tip according to an aspect of this invention is characterized by carrying out the following steps for at least two surface points of the sample:
  placing the tip successively above said surface points of the sample;
  above each of said surface points of the sample, performing distance varying step comprising varying the tip-to-sample distance D, and
  concurrently with distance varying step, performing time dependencies recording step comprising: recording time dependency TC(t) of the tunneling current TC, recording time dependencies $x_{rel}(t)$, $y_{rel}(t)$ of the relative tip-to-sample planar coordinates $x_{rel}$, $y_{rel}$, and recording time dependency D(t) of the tip-to-sample distance D.

In one aspect of the invention, a constant current map is created from the recorded time dependencies TC(t), $x_{rel}$(t), $y_{rel}$(t), D(t).

In another aspect of the invention, a constant height map is created from the recorded time dependencies TC(t), $x_{rel}$(t), $y_{rel}$(t), D(t).

In yet another aspect of the invention, a Local Density of States Topography map is created from the recorded time dependencies TC(t), $x_{rel}$(t), $y_{rel}$(t), D(t).

There is also an aspect of the invention in which a potential barrier map is created from the recorded time dependencies TC(t), $x_{rel}$(t), $y_{rel}$(t), D(t).

One set of data, i. e. one set of time dependencies TC(t), $x_{rel}$(t), $y_{rel}$(t), D(t), is sufficient to obtain all of these maps from one measurement, i. e. from a single scan of the sample.

The advantages of such method are clear: economy of time, possibility to superpose any two, three or all four maps with high precision.

BRIEF DESCRIPTION OF DRAWINGS

FIG. 1a and FIG. 1b illustrate the time dependencies of the tunneling current TC(t), and of the vertical coordinate of the tip $z_{tip}$(t) and of the vertical coordinate $z_{topo}$(t) of the LDOST, for two most common STM state-of-art methods: constant current (FIG. 1a) and constant height (FIG. 1b) methods.

FIG. 3 is a block diagram of the new method according to the present invention with four maps created in a single measurement.

FIG. 4 shows how a protective feedback regime deals with an increase of sample height during measurements with tip-to-sample distance variations.

FIG. 5 shows the TC(DS) dependency and positions of datapoints used to reconstruct the constant current, constant height, LDOST and potential barrier maps.

FIG. 6 illustrates how the constant current map is reconstructed.

FIG. 7 illustrates how the constant height map is reconstructed.

FIG. 8 shows how by fitting the measured dependence TC(D) by equation 1 the sample height SH and potential barrier φ can be found.

DETAILED DESCRIPTION

The method according to an aspect of the present invention can be realized on any conventional microscope having at least one scanning tunneling probe, which can include a scanning tunneling microscope (STM), an atomic force microscope (AFM) combined with an STM (such apparatuses are usually called AFM/STM) etc. To be able to perform the method according to an aspect of the present invention, the apparatus must have at least one scanning tunneling probe. In a preferred embodiment, the apparatus is equipped to change the tip-to-sample distance sufficiently fast.

Figure 2A:
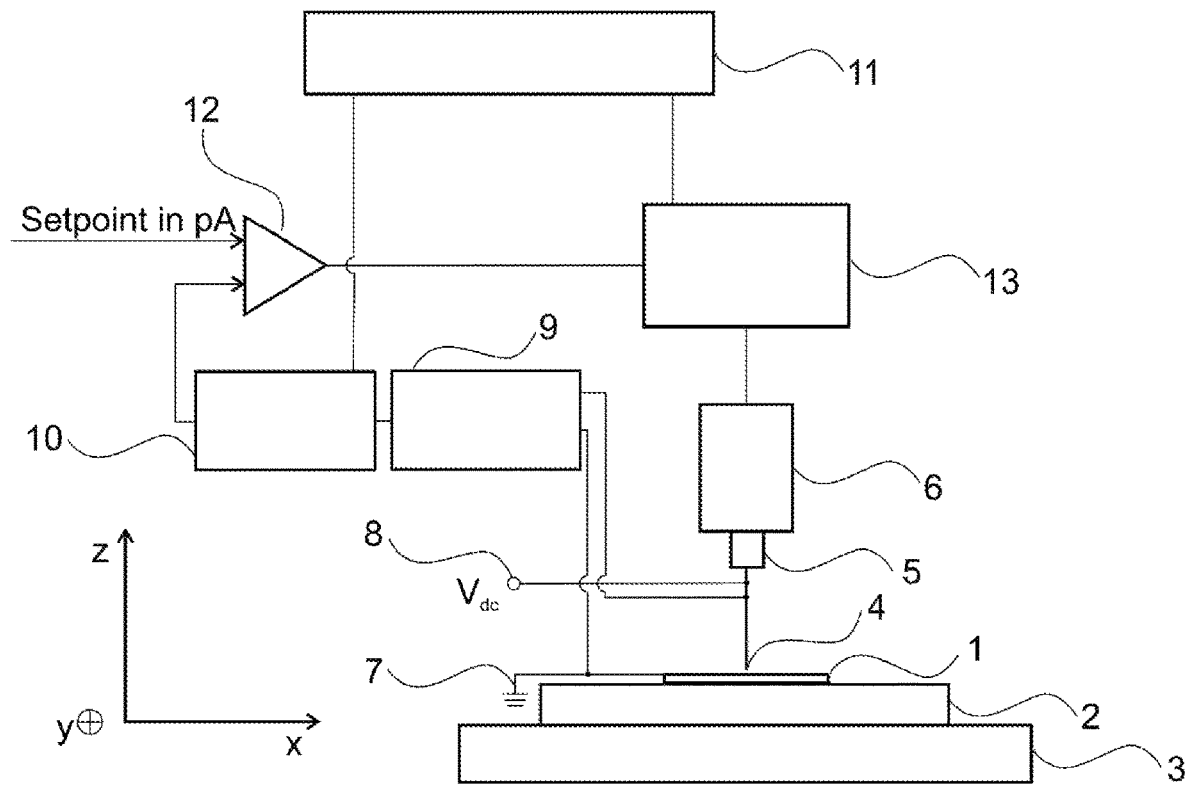
FIG. 2a illustrates the STM functional scheme.

A typical STM is shown in FIG. 2a. The sample 1 is placed on a sample stage 2 attached to a stage actuator 3 of XYZ or XY type, wherein XYZ are conventional cartesian coordinates. To illustrate the embodiments of this invention, Z axis is chosen as vertical and X and Y axes are horizontal. However, any other axis orientation is also possible. The origin of the coordinate system can also be arbitrarily chosen. In this description, a global coordinate system which does not move with the tip and/or sample will be considered. The tip 4 of the STM probe is placed into a tip holder 5, which is attached to a tip actuator 6 of XYZ or XY type. The sample 1 is grounded by a first wire 7. The potential is applied to the tip 4 by a second wire 8. The tunneling current TC is enhanced by a current preamplifier 9, measured in a signal processing module 10 and analyzed by a computer 11. The commands, required to move the sample 1 and/or the tip 4, are send by a controller 12 to a voltage amplifier 13 and to the corresponding actuators 3 and 6.

Definitions

Acronym STM is used for both Scanning Tunneling Microscopy and Scanning Tunneling Microscope.

A relative movement of the tip 4 and of the sample 1 can be carried out by either moving the stage 2 with the sample 1 alone, by moving the tip 4 alone, or by moving both, i. e. by moving the stage 2 with the sample 1 along with moving the tip 4. It is commonplace to change the distance between the tip 4 and the sample 1 by moving the sample 1 or the tip 4. In this application the tip-to-sample distance D changes will be described by the tip 4 movement. As this is the most current scenario, the wording "tip approach" will be used hereinafter to describe more briefly "reduction of the tip-to-sample distance D" or "decrease in the tip-to-sample distance D". Similarly, "tip retraction" should be understood also as "extension of the tip-to-sample distance D" or "increase in the tip-to-sample distance D". As for the movements in the horizontal plane, the most current embodiment is that the tip 4 stays fixed in the horizontal plane and it is only the stage 2 that moves in the horizontal plane.

For sake of simplicity, one global Cartesian coordinate system is selected to describe the LDOS coordinates of the tip $x_{tip}$, $y_{tip}$, $z_{tip}$, of the sample coordinates $x_{sample}$, $y_{sample}$, $z_{sample}$ and the LDOST coordinates of the sample $x_{topo}$, $y_{topo}$, $z_{topo}$. Any global Cartesian system, as the one of FIG. 2a, can be selected. This Cartesian coordinate system has one vertical axis Z and two horizontal axes X, Y. However, with an appropriate calibration, all these sets of coordinates can have their own coordinate systems. In the case of the coordinate system according to FIG. 2a, the tip-to-sample distance D is changed in the vertical direction, i. e. in the direction of the Z-axis. The origin of the system can be placed anywhere aside from the moving parts of the microscope.

Hereinafter, the tip coordinates $x_{tip}$, $y_{tip}$, $z_{tip}$, the sample coordinates $x_{sample}$, $y_{sample}$, $z_{sample}$ and the LDOST coordinates of the sample $x_{topo}$, $y_{topo}$, $z_{topo}$ will be described in the same global Cartesian coordinate system similar to that of FIG. 2a.

The tip coordinates $x_{tip}$, $y_{tip}$, $z_{tip}$ are the coordinates of the tip 4 in term of LDOS. Coordinate $x_{tip}$ and $y_{tip}$ are lateral positions of the tip 4. Coordinate $z_{tip}$ is a vertical position of the tip 4 (see FIG. 2a) corresponding to tip surface LDOS. Coordinates $x_{tip}$, $y_{tip}$ and $z_{tip}$ are defined by the voltages applied to the tip actuator 8.

The sample coordinates $x_{sample}$, $y_{sample}$, $z_{sample}$ are the coordinates of an arbitrary spot of the sample in the same Cartesian coordinate system. Any spot of the sample, including inside the sample, can be chosen as the one for which the sample coordinates $x_{sample}$, $y_{sample}$, $z_{sample}$ will be expressed. These sample coordinates are used to describe the movement of the sample as a whole, when it moves together with the stage 2 driven by the stage actuator 3. As it is usually not possible to measure the sample coordinates $x_{sample}$, $y_{sample}$, $z_{sample}$ directly, the voltages on the actuator 3 with corresponding calibration are used to define the sample coordinates.

The Local Density of Electronic States Topography, or more briefly Local Density of States Topography, with acronym LDOST, is also one of the topics of an aspect of this invention. It provides information about positions of atoms during electron tunneling events.

The goal of STM measurements is to probe the LDOS of the sample surface. In order to avoid confusion, we distinguish LDOS, which is probed during conventional constant current and constant height STM measurements, and LDOST, which is evaluated by presented method.

Figure 2B:
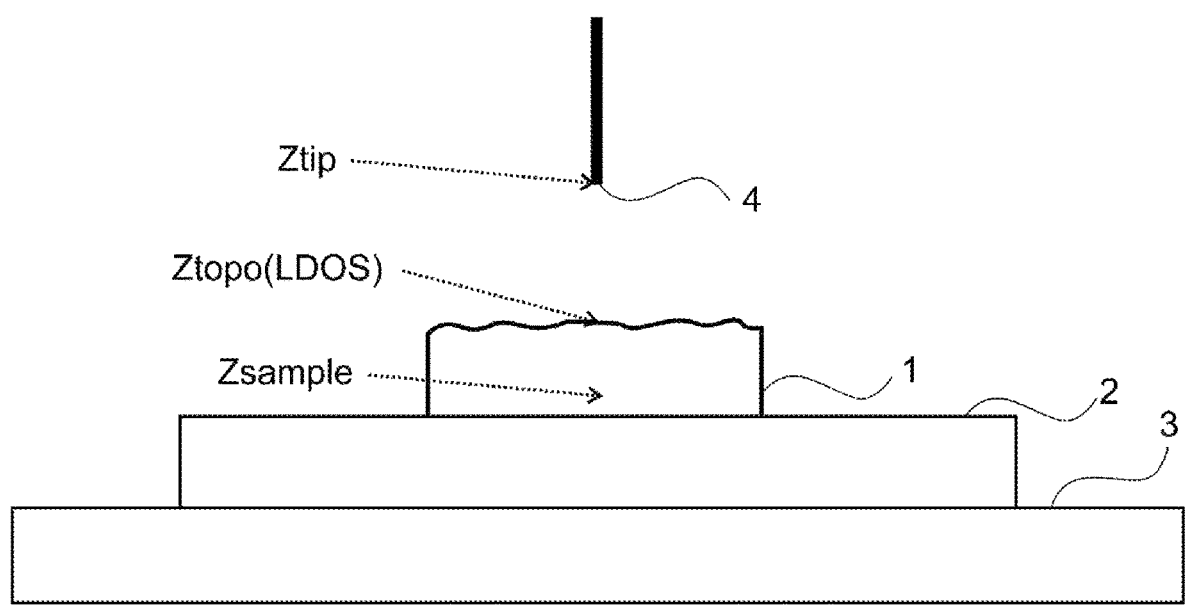
FIG. 2b illustrates the definition of vertical coordinates $z_{tip}$, $z_{topo}$, $z_{sample}$.

The sample 1 height coordinate corresponding to sample surface LDOS, i.e. LDOST of the sample 1, will be noted $z_{topo}$. The definition of this coordinate is shown in the FIGS. 2b and 2c for one surface point of the sample. The $z_{topo}$ coordinate can be attributed to all surface points of the sample. The lateral coordinates of the surface points of the sample will be noted as $x_{topo}$, $y_{topo}$.

It is convenient to have the zero-level of Z axis at the lowest surface point for the sample 1 placed on the fixed stage 2 and describe the relative movement by the tip 4 movement only, as it is done in present application.

Tip-to sample distance D is defined in the above-described global coordinate system of FIG. 2a as $D=z_{tip}-z_{sample}$, i. e. as a difference between the tip coordinate $z_{tip}$ along the vertical axis Z and the sample coordinate $z_{sample}$ along the vertical axis Z. Tip-to sample distance D is defined by voltages, applied to actuators 3 and 6.

Figure 2C:
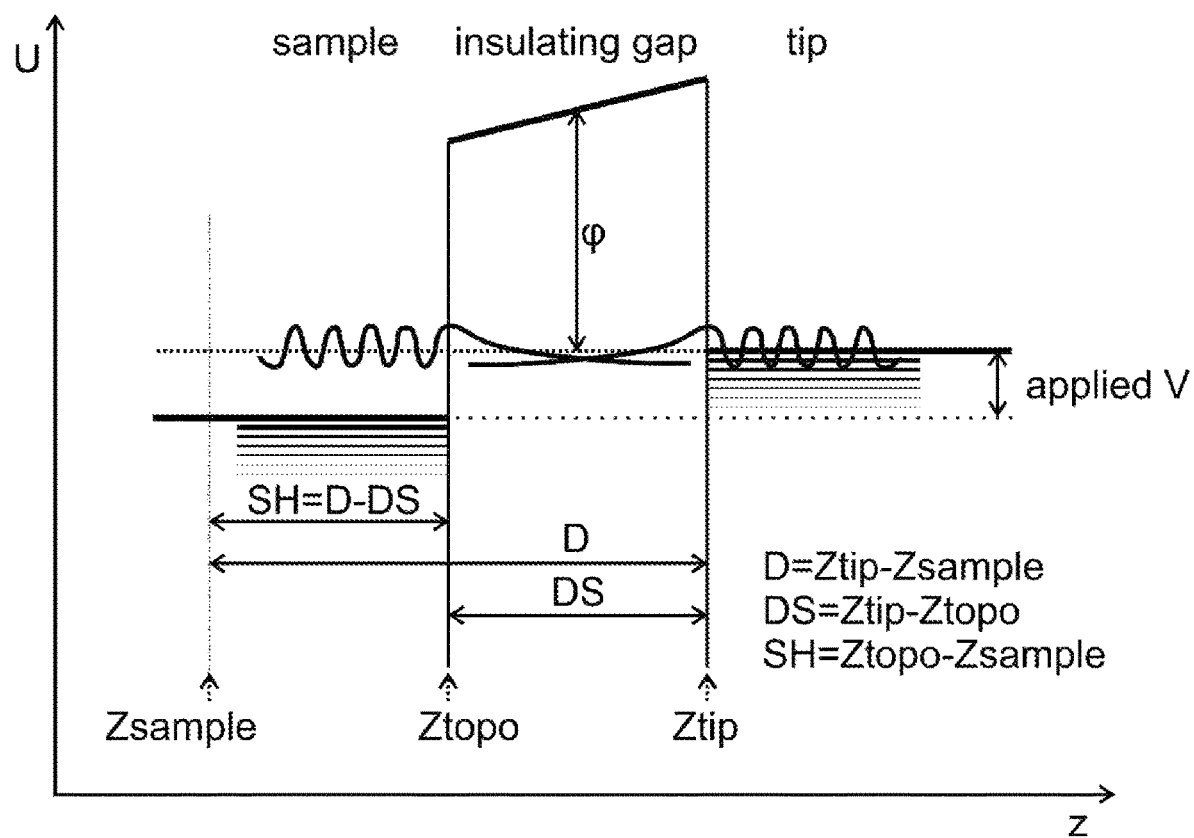
FIG. 2c illustrates the diagram of sample-insulator-tip system and the definition of D, DS and SH in terms of LDOS.

The tip-to-sample surface distance DS in terms of LDOS is defined as potential barrier width for electrons occupying the Fermi level, as shown in the FIG. 2c. $DS=z_{tip}-z_{topo}$. The tip-to-sample surface distance DS is defined by fitting of TC(D) curve in each studied point of the sample by equation 1.

The sample height SH is a Local Density of Electronic States Topography of the sample surface. It is defined as $SH=D-DS=z_{topo}-z_{sample}$.

The potential barrier $\varphi$ is the averaged barrier height $\overline{\varphi} \equiv \varphi$, i.e. the averaged barrier height between the tip 4 and the surface point of the sample 1, as shown in the FIG. 2c.

Relative tip-to-sample planar coordinates $x_{rel} \equiv x_{tip}-x_{sample}=x_{tip}-x_{topo}$ and $y_{rel}=y_{tip}-y_{sample}=y_{tip}-y_{topo}$ are the differences between corresponding tip 4 and sample 1 coordinates along horizontal axes X and Y. The relative position of the tip 4 and the sample 1 in a horizontal plane is important to determine above which surface point of the sample 1 is placed the tip 4, particularly during the scanning.

The tunneling current TC is the current that can be detected between the tip 4 and the sample 1 for appropriate tip-to-sample distances D and applied voltage V.

The time dependencies of all variables showing such dependency will be noted by the sign of the variable followed by (t), t meaning the time. Eg. TC(t) is the time dependency of the tunneling current, $x_{rel}(t)$ is the time dependency of the first relative tip-to-sample planar coordinate, $y_{rel}(t)$ is the time dependency of the second relative tip-to-sample planar coordinate, D(t) is the time dependency of the tip-to-sample distance, etc.

If the variation of the tip-to-sample distance is set as a quasi-periodical oscillation of periodical oscillation, an amplitude A and frequency f are introduced. As it is usually the tip 4 that moves in vertical direction above the sample 1 to change the tip-to-sample distance, the amplitude A and the frequency f will most often correspond to the tip 4 oscillations. The changes in sample properties can cause the changes in average tip-to-sample distance D.

The setpoint tunneling current $S_{TC}$, is the highest allowable tunneling current, it is defined by the operator or by the microscope software.

The setpoint tip-to-sample distance $S_D(t)$ is the distance between the tip 4 and the sample 1 when $TC(t)=S_{TC}$. This distance inherently varies depending on the sample 1 properties and morphology due to the feedback keeping maximum $TC(t)=S_{TC}$.

The constant current CC is a current value used to reconstruct the constant current map.

The constant height CH is a value of the tip-to-sample distance D used to reconstruct the constant height map.

The constant current CC and the constant height CH values are selected by the operator or by the microscope software according to information that should be retrieved from the measurement.

In FIG. 1a, the state-of-art constant current method is explained, i. e. it is explained how the constant current maps are constructed. In FIG. 1b, the state-of-art constant height method is explained, i. e. it is explained how the constant height maps are constructed.

The time dependency of sample 1 LDOST coordinate $z_{topo}$ is plotted as a topography curve 14, the time dependency of the tip 4 coordinate $z_{tip}$ is plotted as tip curve 15, and the tunneling current TC time dependency is plotted as tunneling current curve 16.

FIG. 1a and FIG. 1b illustrate how the STM controller 12 in the state-of-art methods deals with the increase in sample topography. This increase is registered as an increase in the sample surface point z-coordinate of $z_{topo}$ when moving from one point of the sample to another, e.g. by scanning the sample surface. The time dependency $z_{topo}(t)$ of $z_{topo}$ when moving in the horizontal direction between two regions of the sample with different topography, is plotted as topography curve 14. In this example, $z_{topo}$ changes from 0 nm to 100 pm. During the preliminary time interval 17 from 0 to 500 μs, $z_{topo}=0$ nm. Then, during the transition time interval 18 with 50 μs duration, $z_{topo}$ varies from 0 nm to 100 μm. Then, during the feedback time interval 19 with 50 μs duration and during the final time interval 20, $z_{topo}=100$ pm. For both images $z_{sample}=0$ nm during all four time intervals 17, 18, 19, 20, i. e. the sample does not move in the vertical direction.

In the constant current method (FIG. 1a) the decrease of the tip-to-sample surface distance DS due to the increase in the sample LDOS topography causes the increase of tunneling current during the transition time interval 18, see the tunneling current dependency curve 16. The constant tunneling current CC is set. There is a feedback that forces the current to return to the constant current CC value by initiating an upward tip movement during the feedback time interval 19 which lasts until the tunneling current TC returns to its initial value CC. Vice versa, the feedback would move the tip downwards for a depression in the sample LDOS topography. In this example, the feedback time interval 19 lasts from 550 μs to 600 μs, see the tip curve 15. The tip-to-sample distance D is thus increased and at 600 μs, the tunneling current TC returns to its original constant current CC value, see the tunneling current curve 16. During the preliminary time interval 17 and the final time interval 20, the tunneling current TC has thus the same value, the constant current value CC. When scanning the sample across multiple surface points, a constant current map 38 can be created as a map of $D=z_{tip}-z_{sample}$ coordinates for which the recorded tunneling current TC was equal to the constant current CC.

In the constant height method (FIG. 1b) the position of the tip $z_{tip}$ is constant, $z_{tip}=CH+z_{sample}$, as shown by the tip curve 15, and the tip-to-sample distance D is constant as well and equal to CH, thus the reduction of tip-to-sample surface distance DS causes the increase of tunneling current TC during the transition time interval 18, see the tunneling current dependency curve 16. When scanning the sample across multiple surface points, a constant height map 39 can be created as a map of tunneling currents TC obtained when scanning the sample with the tip coordinate $z_{tip}$ set constant and equal to $CH+z_{sample}$.

It is obvious that according to the state-of-art methods, to obtain the constant current map, it is necessary to scan the sample when keeping the tunneling current TC constant, whereas to obtain the constant height map, it is necessary to rescan it again, this time while keeping the tip-to-sample distance $D=z_{tip}-z_{sample}$ constant.

According to an aspect of the present invention, all maps, i. e. the constant current map 38, the constant height map 39, the LDOST map 40 and the potential barrier map 41 can be obtained from a single scan of the sample.

To this aim, the new method comprises carrying out the following steps for at least two surface points of the sample 1:
  placing the tip 4 successively above said surface points of the sample 1, which is typically done by moving the tip 4 and/or by moving the sample 1 in the horizontal direction;
  above each of said surface points of the sample, performing a distance varying step 33 comprising varying the tip-to-sample distance D, and
  concurrently with the distance varying step 33, performing a time dependencies recording step 35 comprising: recording time dependency TC(t) of the tunneling current TC, recording time dependencies $x_{rel}(t)$, $y_{rel}(t)$ of the relative tip-to-sample planar coordinates $x_{rel}$, $y_{rel}$, and recording time dependency D(t) of the tip-to-sample distance D.

The method works for at least two surface points of the sample, while the most advantageous embodiment is the one when a scanning movement is performed, i. e. when the tip 4 is placed successively above a plurality of surface points of the sample 1 by scanning movement 34 of the sample 1 and/or of the tip 4 in a horizontal plane and wherein while performing the scanning movement 34, the distance varying step 33 and the time dependencies recording step 35 are carried out.

The relative tip-to-sample planar coordinates $x_{rel}=x_{topo}-x_{sample}$, $y_{rel}=y_{topo}-y_{sample}$, can be used to calculate the planar coordinates $x_{topo}$, $y_{topo}$ of each sample surface point above which the tip 4 was placed, in a coordinate system related to the sample.

A map denotes a 3D image with at least two couples of planar coordinates $x_{rel}$, $y_{rel}$ of at least two map points. Each of the map points has a space coordinate corresponding to some value interesting from the point of view of sample properties. It can be e. g. the tunneling current, tip-to-sample distance, sample height or potential barrier.

Above each surface point of the sample, for which map points of at least two maps should be created from a single measurement, it is necessary to vary a tip-to-sample distance D at least to some extent. It is not necessary to have the same span of the tip-to-sample distance D for all surface points of the sample. A tip approach can continue above more than one surface point of the sample 1, and similarly, a tip retraction can continue above more than one surface point of the sample 1. However, it is advantageous to perform the distance varying step 33 with approximately the same span, i. e. with approximately the same difference between the minimum and the maximum distance, above each of the surface points of the sample for which one of the maps should be created, the maps including the constant current, constant height, LDOST and potential barrier map.

To avoid the contact between the tip 4 and the sample 1 that can result in destroying the tip 4 and/or the sample 1 surface, in a preferred embodiment, the operator or the microscope software determine a setpoint tunneling current $S_{TC}$ as the highest allowable tunneling current.

In a preferred embodiment, a preliminary approach 32 between the tip 4 and the sample 1 is carried out before performing the distance varying step 33 for the first time. The preliminary approach is stopped when the tunneling current TC reaches the value of the setpoint tunneling current $S_{TC}$. Then the tip-to-sample distance D is increased for A.

To avoid collision between the tip 4 and the sample 1, a feedback regime is set up so that when the tunneling current TC becomes greater than the setpoint tunneling current $S_{TC}$, the tip-to-sample distance D is extended.

Figure 4:
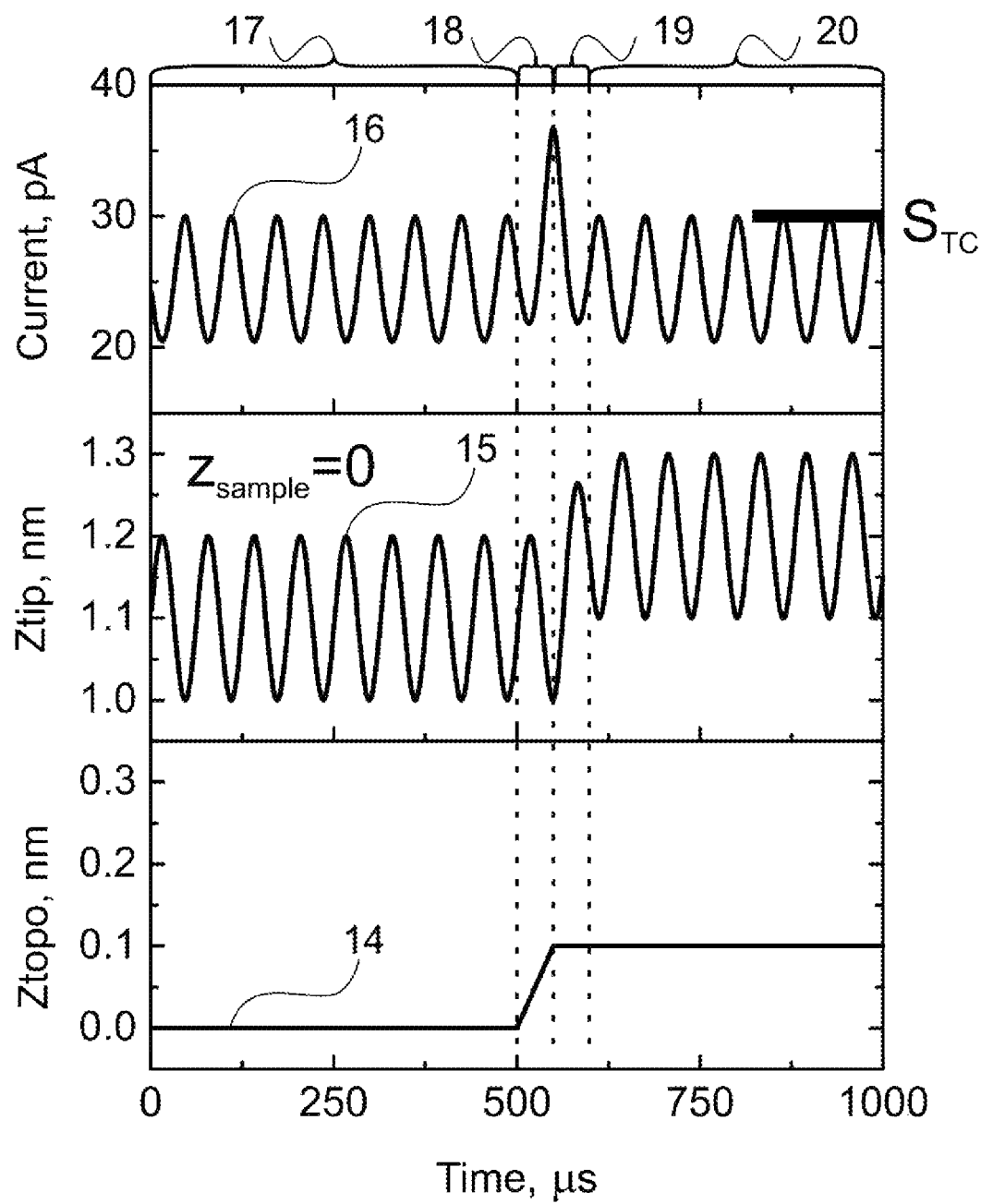

This feedback regime is illustrated in FIG. 4. A preferred embodiment with $z_{sample}=0$ and $z_{tip}$ varying periodically is shown. However, similar feedback can be used for any embodiment in which the tip-to-sample distance D is varied in any manner. FIG. 4 shows how the feedback regime deals with the increase in sample topography $z_{topo}$, as shown in the topography curve 14, from 0 nm during the preliminary time interval 17 from 0 μs at 500 μs to 100 pm at 550 μs. The time axis is common for all $z_{topo}$, $z_{tip}$ and TC dependencies. In this preferred embodiment, the position of the tip 4 is oscillating above the sample surface, see the tip curve 15. The tunneling current (TC) is thus oscillating too, see the tunneling current curve 16. While oscillating, the tip 4 moves from a region of the sample 1 where the surface points have $z_{topo}=0$ nm, to a region with surface points having greater $z_{topo}=100$ μm. The decrease of tip-to-sample surface distance DS causes the increase of the tunneling current TC with a maximum at 550 μs during the transition time interval 18. During feedback time interval 19 feedback forces the upward movement of the tip 4, see the tip curve 15, at 600 μs and returning of tip-to-sample surface distance DS and tunneling current 16 to same oscillations during final time interval 20, i.e. maximum tunneling current TC in each oscillation cycle is equal to threshold value $S_{TC}$.

In yet another aspect of the invention, that can be advantageously combined with the above-mentioned feedback regime, varying the tip-to-sample distance D comprises setting the amplitude A of the tip-to-sample distance D variation and then repeatedly decreasing and increasing the tip-to-sample distance D between the setpoint tip-to-sample distance $S_D(t)$ and the setpoint tip-to-sample distance $S_D(t)$ plus twice the amplitude A.

It is possible to vary tip-to-sample distance D mechanically by actuators 3 or 6 or by additional high frequency actuator, which will manage the tip-to-sample distance oscillations. Such additional actuator can be helpful as in this case fast tip-to-sample distance oscillations managed by high frequency actuator will not interfere with slow changes in the tip-to-sample distance caused by feedback and managed by actuators 3 and 6.

In one preferred embodiment, the amplitude A falls in the range of 100 pm to 10 nm.

A frequency f can be set and the tip-to-sample distance D can be varied with said frequency f. The changes in tip-to-sample distance are then periodical or quasi-periodical.

In one preferred embodiment, the frequency f falls in the range of 1 kHz to 1000 KHz.

Thanks to varying the tip-to-sample distance D while recording the time dependencies TC(t), $x_{rel}(t)$, $y_{rel}(t)$, D(t), two or more maps (selected from a group comprising constant current map, constant height map, LDOST map and potential barrier map) can be reconstructed from just one scan of the sample. More details about how each of the maps is reconstructed are disclosed hereinafter.

The constant current map is created from the recorded time dependencies TC(t), $x_{rel}(t)$, $y_{rel}(t)$, D(t) for at least two surface points of the sample 1 above which the tip 4 was placed when the tip-to-sample distance D was varied. In a preferred embodiment, the constant current map is created for a plurality of surface points of the sample 1 above which the tip 4 was placed during the scanning movement 34 of the sample 1 and/or of the tip 4 in a horizontal plane.

First, an operator or the microscope software determines a constant current CC value within the range of the recorded tunneling currents TC.

Then, the recorded time dependency TC(t) is examined and among the values of time t, constant current times $t_{CC}$ are found as the times for which the recorded value of the tunneling current $TC(t_{CC})$ was equal to the constant current CC. In this way, a plurality of values of constant current times $t_{CC}$ is retrieved.

Consequently, the constant current map is created as a plurality of constant current map points with planar coordinates of each constant current map point equal to relative tip-to-sample planar coordinates $x_{rel}(t_{CC})$, $y_{rel}(t_{CC})$, recorded when time t was equal to one of the constant current times $t_{CC}$, and with space coordinate of each constant current map point equal to tip-to-sample distance $D(t_{CC})$ recorded when time t was equal to one of the constant current times $t_{CC}$. The horizontal coordinates $x_{rel}(t_{CC})$, $y_{rel}(t_{CC})$ and the space coordinate $D(t_{CC})$ of the same constant current map point have the same constant current time $t_{CC}$.

Figure 6:
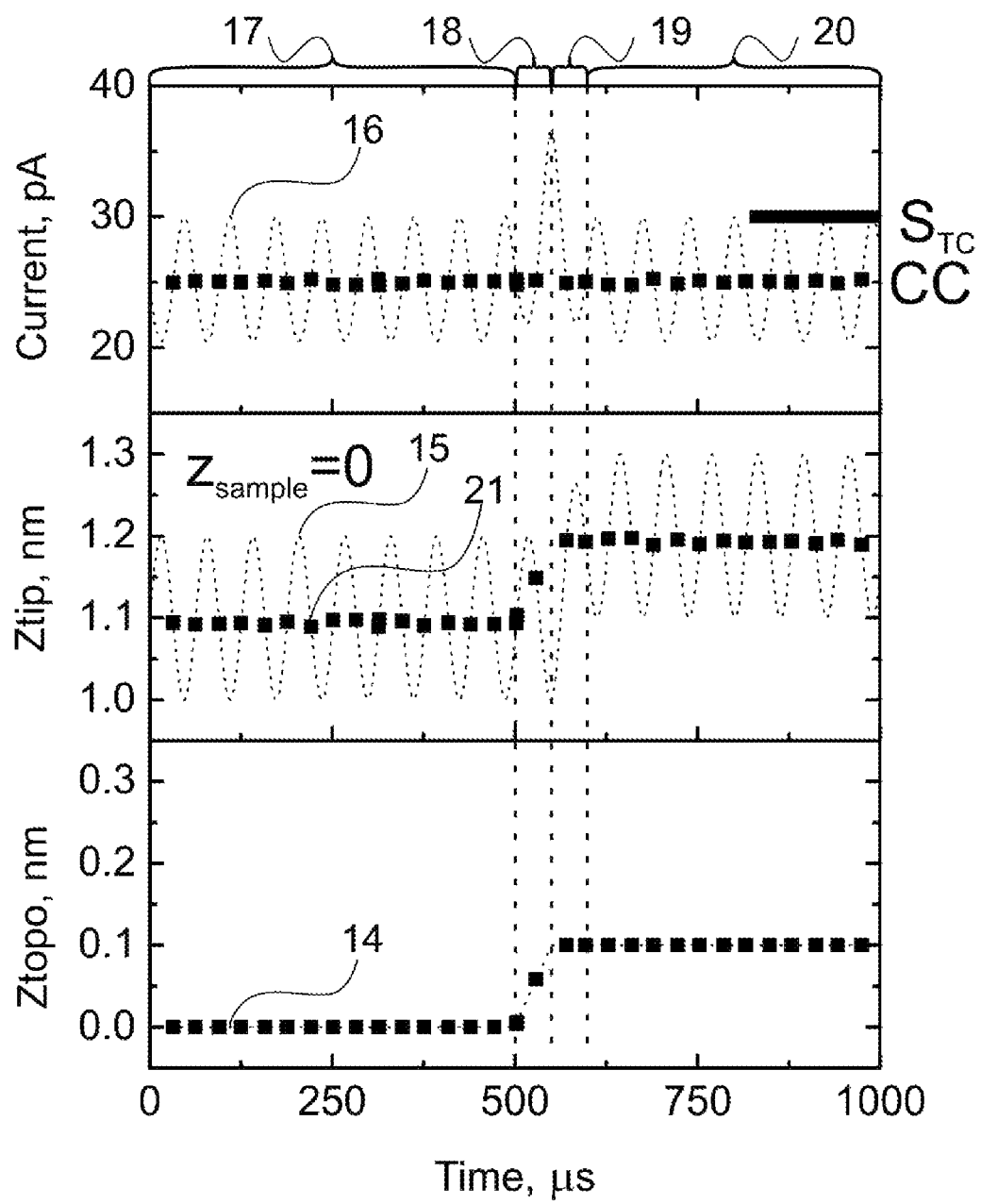

FIG. 6 illustrates an example of how the constant current map 38 can be created from the time dependencies recorded in the time dependency recording step 35 according to an aspect of the invention. For sake of simplicity, in FIG. 6, we consider $z_{sample}=0$. The measured tip curve 15, showing the dependency $z_{tip}(t)$, is thus equivalent to the curve of the time dependency D(t) of the tip-to-sample distance D. The measured tunneling current curve 16 showing the time dependency TC(t) of the tunneling current, is also shown. The constant current CC is set as CC=25 pA. The $z_{tip}$ and thus also tip-to-sample distance D values that were recorded at each time when the tunneling current TC was equal to CC, are marked with first squares 21 on the tip curve 15. These values are plotted as space coordinates in the constant current map. To each value of the tip-to-sample distance D, or to each value of $z_{tip}$ in this example with $z_{sample}=0$, corresponding to one of the first squares 21, planar coordinates of the same constant current map point are assigned as the relative tip-to-sample planar coordinates $x_{rel}(t)$, $y_{rel}(t)$ recorded at the same time as the tip-to-sample distance D corresponding to one of the first squares 21.

The constant height map is created from the recorded time dependencies TC(t), $x_{rel}(t)$, $y_{rel}(t)$, D(t) for at least two surface points of the sample 1 above which the tip 4 was placed when the tip-to-sample distance D was varied. In a preferred embodiment, the constant height map is created for a plurality of surface points of the sample 1 above which the tip 4 was placed during the scanning movement 34 of the sample 1 and/or of the tip 4 in a horizontal plane.

First, an operator or the microscope software determines a height tip-to-sample distance CH within the range of the recorded tip-to-sample distances D.

Then, the recorded time dependency D(t) is examined and among the values of time t, constant height times $t_{CH}$ are found as the times for which the recorded value of tip-to-sample distance $D(t_{CH})$ was equal to the constant height tip-to-sample distance CH. In this way, a plurality of values of constant height times $t_{CH}$ is retrieved.

Consequently, the constant height map is created as a plurality of constant height map points wherein planar coordinates of each constant height map point are equal to relative tip-to-sample planar coordinates $x_{rel}(t_{CH})$, $y_{rel}(t_{CH})$ recorded when time t was equal to one of the constant height times $t_{CH}$, and wherein space coordinate of each constant height map point correspond to tunneling currents TC(ICH) recorded when time t was equal to one of the values of the constant height time $t_{CH}$. The planar coordinates and the space coordinate of the same constant height map point have the same constant height time $t_{CH}$.

Figure 7:
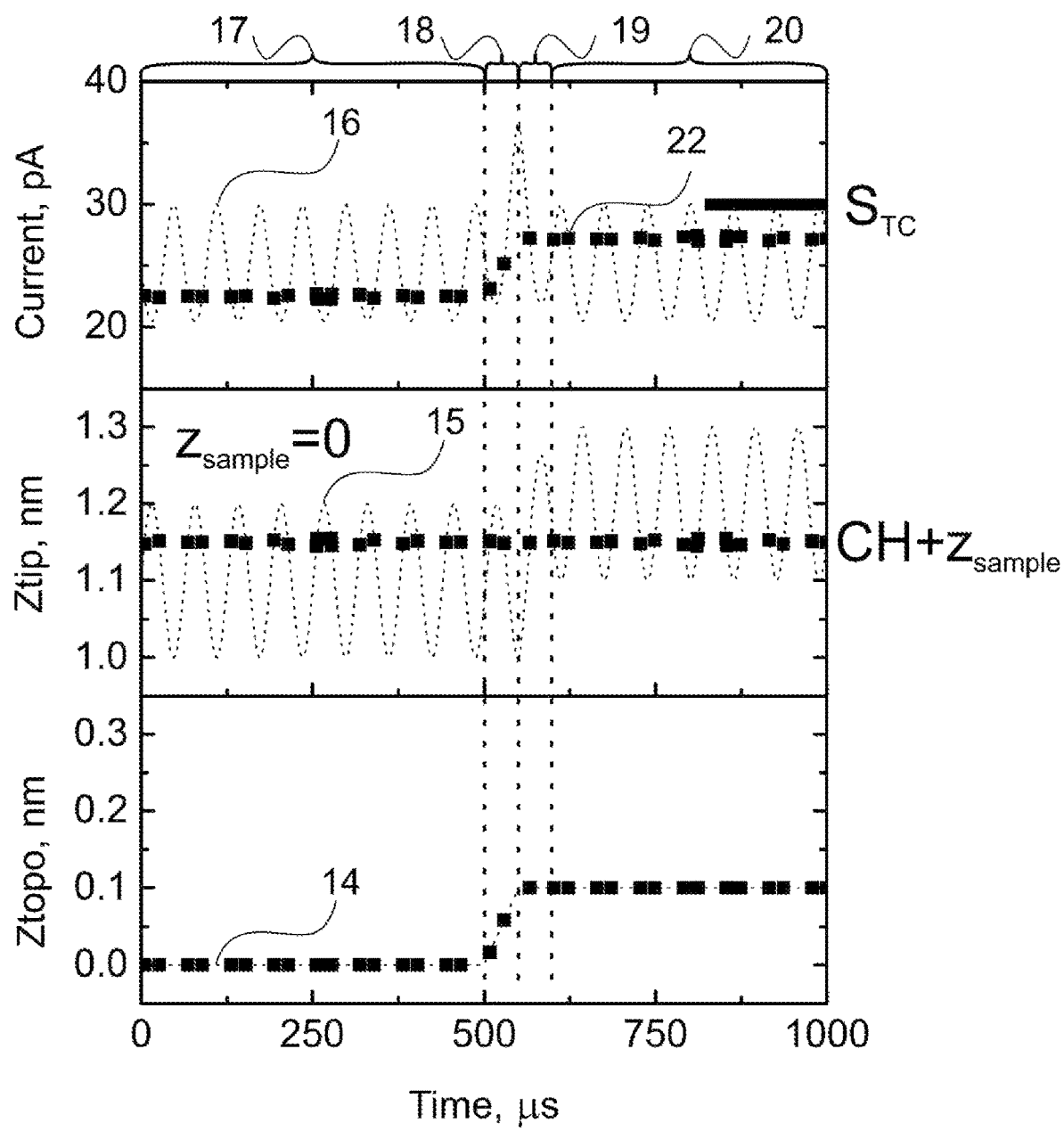

FIG. 7 illustrates an example of how the constant height map can be created from the time dependencies recorded during the time dependencies recording step 35 according to an aspect of the invention. For sake of simplicity, in FIG. 7, we consider $z_{sample}=0$. The measured tip curve 15 is thus a curve of the time dependency D(t) of the tip-to-sample distance D. The constant height is set as CH=1.15 nm. The current values reached each time when the tip-to-sample distance D was equal to the constant height CH, are marked with second squares 22 on the tunneling current curve 16. These values are plotted as space coordinates in the constant height map. To each value of current corresponding to one of the second squares 22, planar coordinates of the same constant height map point are assigned as the relative tip-to-sample planar coordinates $x_{rel}(t)$, $y_{rel}(t)$ recorded at the same time as the tunneling current TC corresponding to one of the second squares 22.

Based on the recorded time dependencies TC(t), $x_{rel}(t)$, $y_{rel}(t)$, D(t) for at least two surface points of the sample 1 above which the tip 4 was placed when the tip-to-sample distance D was varied, a Local Density of States Topography map 40 and a potential barrier map 41 can be created.

The values of sample height SH and of potential barrier φ can be retrieved from the recorded time dependencies TC(t), $x_{rel}(t)$, $y_{rel}(t)$, D(t) by carrying out the following sequence of steps for at least two surface points of the sample 1 above which the tip 4 was placed when the tip-to-sample distance D was varied:

determining a sample surface point specific time interval <$t_1$, $t_2$> as a time interval during which the tip 4 remained above this surface point of the sample 1 and using the time dependencies TC(t), D(t) recorded during the surface point specific time interval <$t_1$, $t_2$> to reconstruct the dependency TC(D) of the tunneling current TC on the tip-to sample distance D for this surface point of the sample 1, and finding a sample height SH and a potential barrier φ by fitting the dependency TC(D), obtained for the sample surface point specific time interval <$t_1$, $t_2$> by equation:

$$TC(D) = \frac{\gamma \sigma \sqrt{\varphi} V}{D - SH} \exp(-B(D-SH)\sqrt{\varphi}), \quad 1$$

where potential barrier φ is equal to the averaged barrier height $$\overline{\varphi}, \gamma = \frac{e\sqrt{2m}}{4\beta\pi^2 \hbar^2}, B = 2\beta\sqrt{\frac{2m}{\hbar^2}},$$

β is a dimensionless factor, V is a voltage between the tip 4 and the sample 1, σ is a tunneling area, m is free electron mass, e is elementary charge, $\hbar$ is Planck's constant.

Equation 1 can be found in e. g. https://www.ntmdt-si.com/resources/spm-theory/theoretical-background-of-spm/1-scanning-tunnel-microscopy-(stm)/13-observed-physical-quantities-in-stm/132-current-distance-characteristic.

Dimensionless factor β~1. Its more precise value can be found in e. g. https://www.ntmdt-si.com/resources/spm-theory/theoretical-background-of-spm/1-scanning-tunnel-microscopy-(stm)/12-tunnel-current-in-mim-system/121-appendix.

More detailed definitions of averaged barrier height $\overline{\varphi} \equiv \varphi$ and potential barrier width for electrons occupying the Fermi level $\delta_z \equiv DS$ can be found in e. g. https://www.ntmdt-si.com/resources/spm-theory/theoretical-background-of-spm/1-scanning-tunnel-microscopy-(stm)/12-tunnel-current-in-mim-system/121-john-g-simmons-formula.

The first time $t_1$ limiting the sample surface point specific time interval $<t_1, t_2>$ is defined as a time when the tip 4 arrives above the surface point of the sample 1 for which by fitting the dependency TC(D) by equation 1 is carried out. The second time $t_2$ limiting the sample surface point specific time interval $<t_1, t_2>$ is defined a time when the tip 4 leaves the place above this surface point of the sample 1. Thus, in each sample surface point specific time interval $<t_1, t_2>$ coordinates $x_{rel}(t)$ and $y_{rel}(t)$ are constant, D(t) and TC(t) vary in time, but fitted SH and φ values are constant.

If the above-described fitting procedure is done for a plurality of surface points of the sample 1, a Local Density of States Topography map 40 can be created as a plurality of Local Density of States Topography map points. Each of the Local Density of States Topography map points has planar coordinates $x_{rel}(t)$ and $y_{rel}(t)$ and a space coordinate which corresponds to one of the sample heights SH. For each of Local Density of States Topography map points, time t in $x_{rel}(t)$, $y_{rel}(t)$ is a time arbitrary chosen from one of the sample surface point specific time intervals $<t_1, t_2>$, and the sample height SH attributed as a space coordinate to the same Local Density of States Topography map point is retrieved from the dependency TC(D) reconstructed from the time dependencies TC(t), D(t) recorded during the same sample surface point specific time interval $<t_1, t_2>$. In other words, each LDOST map point assigns to one of the surface points of the sample its characteristic value of sample height SH.

By analogy, if the above-described fitting procedure is done for a plurality of surface points of the sample, also a potential barrier map 41 can be created as a plurality of potential barrier map points. Each of the potential barrier map points has planar coordinates $x_{rel}(t)$ and $y_{rel}(t)$ and a space coordinate which corresponds to one of the potential barriers φ. For each of the potential barrier map points, time t in $x_{rel}(t)$, $y_{rel}(t)$ is a time arbitrary chosen from one of the sample surface point specific time intervals $<t_1, t_2>$, and the potential barrier φ attributed as a space coordinate to the same potential barrier map point is retrieved from the dependency TC(D) reconstructed from the time dependencies TC(t), D(t) recorded during the same sample surface point specific time interval $<t_1, t_2>$. In other words, each potential barrier map point assigns to one of the surface points of the sample its characteristic value of potential barrier.

Figure 5:
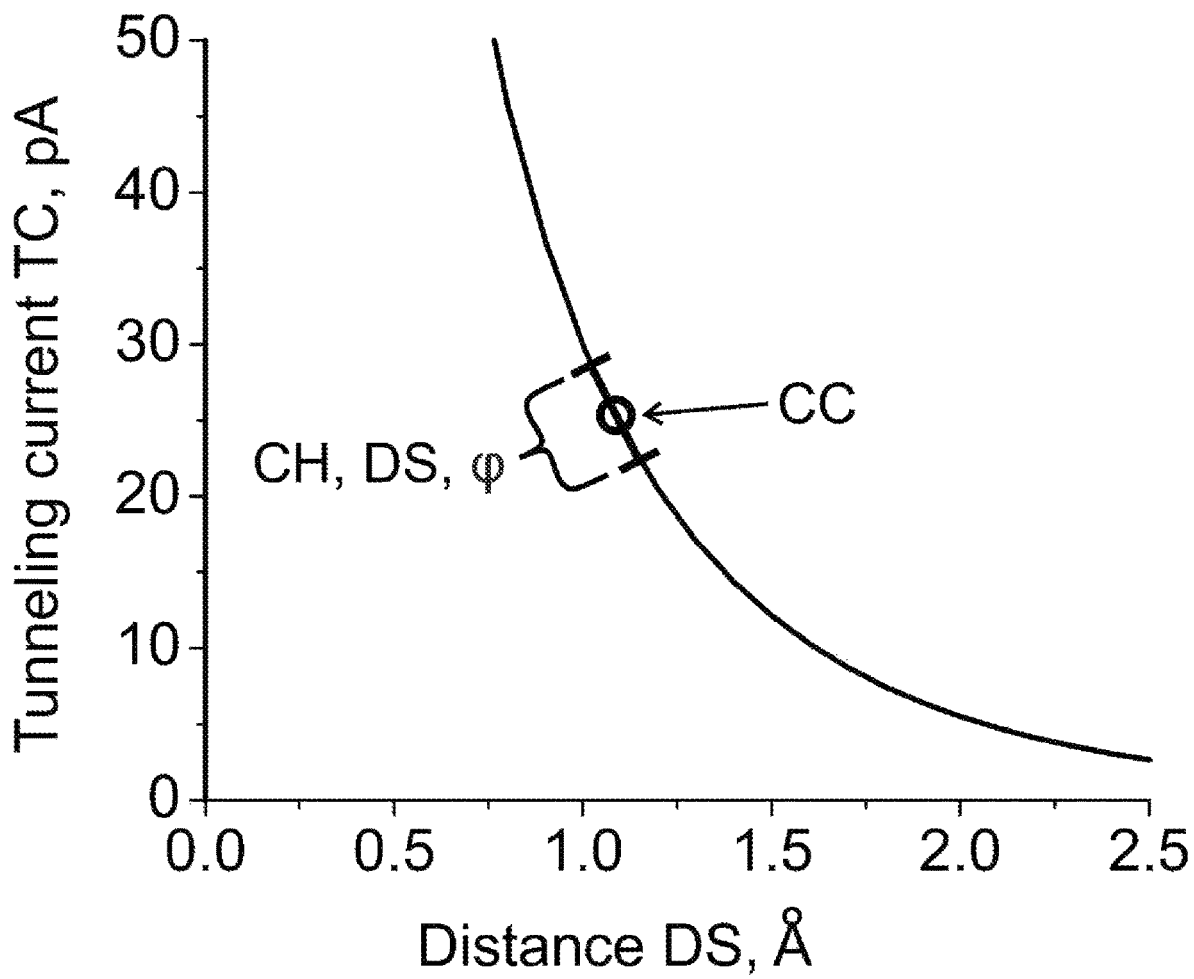

FIG. 5 illustrates the dependence between the tunneling current TC and distance between the tip and the sample surface DS. Data were calculated using formula TC=81.5485/DS×exp(−DS), where TC is in pA and DS is in nm. According to an aspect of the present invention, four maps can be reconstructed from a single sample scan. In an example shown in FIG. 5, the constant current map is reconstructed for constant current CC=25 pA, DS=1.1 nm. Constant height map is reconstructed for the constant height CH=1.15 nm, i.e. for distances DS=1.05-1.15 nm. Based on the dependency TC(D) reconstructed from the time dependencies TC(t) and D(t), the sample height SH=D—DS and the potential barrier φ are determined in each point of the sample by fitting the measured dependency TC(D) by equation 1. Result is the same as the bottom image in FIG. 4, i.e. $z_{topo}$ data and φ=1/B².

Figure 8:
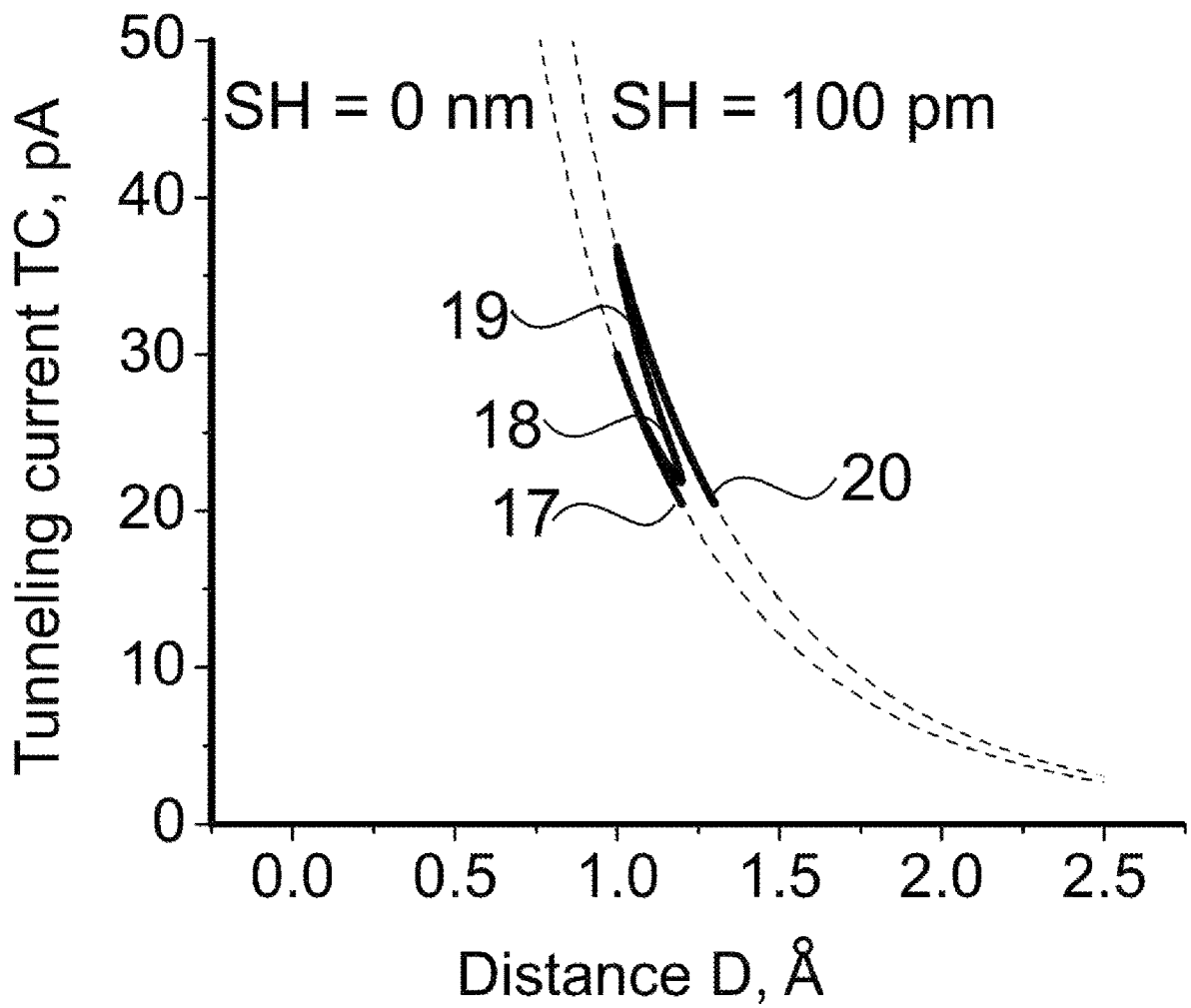

FIG. 8 illustrates how by fitting the measured dependence TC(D) by equation 1 the sample height SH=D−DS and potential barrier φ (it is constant in this case) are defined for the preliminary time interval 17 when SH=0 nm, and for the final time interval 20, when SH=100 μm.

Figure 3:
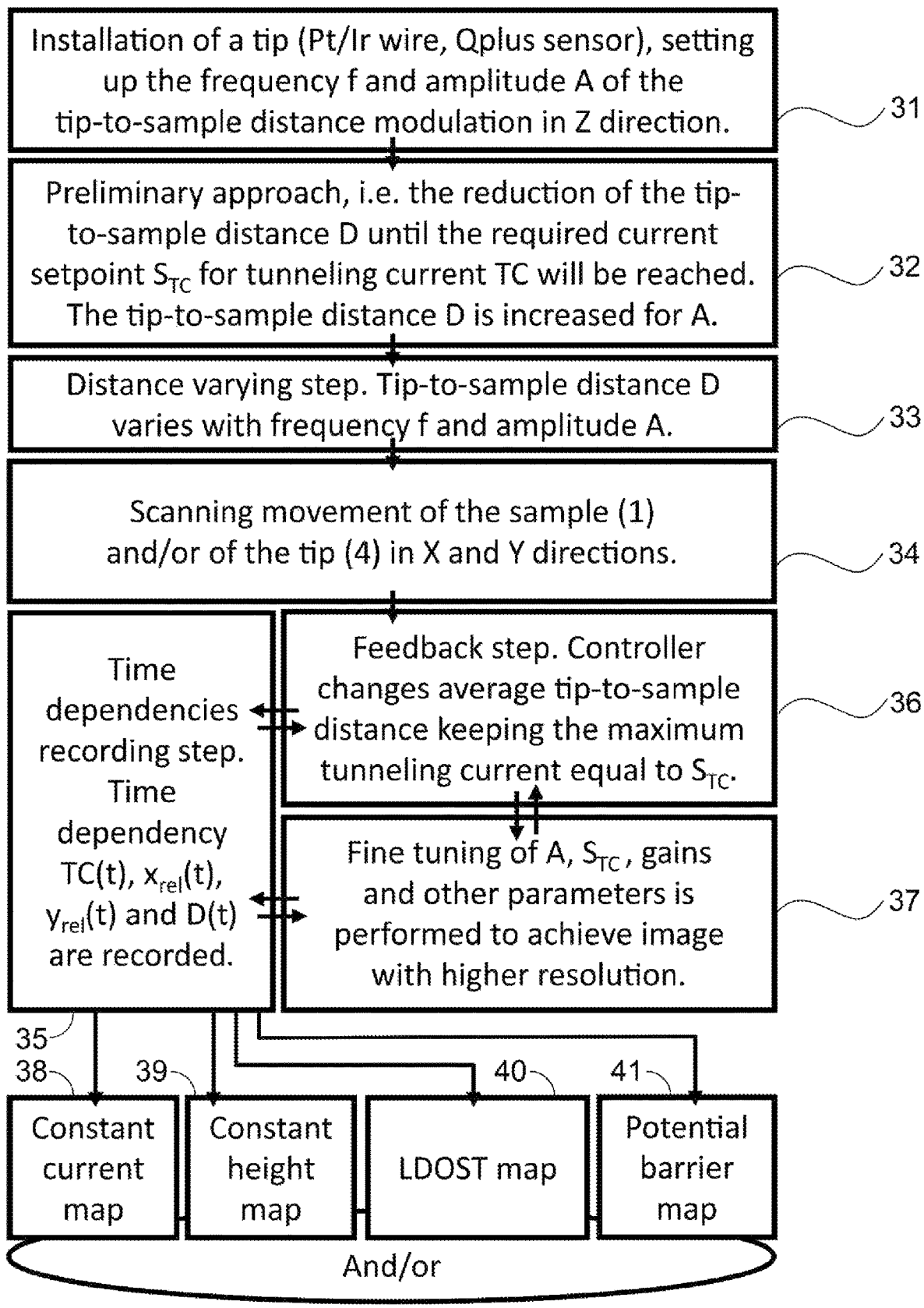
FIGS. 3 to 8 illustrate the new method in a microscope with at least one scanning tunneling probe where the tip-to-sample distance is varied.

FIG. 3 illustrates the most complex embodiment of the mechanically oscillating STM method according to an aspect of the present invention, where all the four maps are created, i. e. the constant current map 38, the constant height map 39, LDOST map 40 and the potential barrier map 41. Block 31 describes installation of the tip 4, setting up the frequency f and amplitude A of the tip-to-sample distance D oscillations. Then the preliminary approach 32 is presented. Block 33 describes the most important step of an aspect of this invention, the distance varying step. After starting the tip-to-sample distance oscillations the scanning movement of the sample 1 and/or tip 4 in X and Y direction 34 is performed. Time dependencies recording step 35, feedback step 36 and fine tuning step 37 are taking place at the same time during measurements. Based on analysis of TC(t), D(t), $x_{rel}(t)$ and $y_{rel}(t)$ dependencies all the four maps are created, i. e. the constant current map 38, the constant height map 39, LDOST map 40 and the potential barrier map 41. By "and/or" oval block we mean that operator can choose 1, 2, 3 or 4 maps to be reconstructed.

Although the present invention and its advantages have been described in detail, it should be understood that various changes, substitutions and alterations can be made herein without departing from the spirit and scope of the invention as defined by the appended claims. As one of ordinary skill in the art will readily appreciate from the disclosure of the present invention, processes, apparatuses, means, methods, or steps, presently existing or later to be developed that perform substantially the same function or achieve substantially the same result as the corresponding embodiments described herein may be utilized according to the present invention. Accordingly, the appended claims are intended to include within their scope such processes, apparatuses, means, methods, or steps.

The method of examining a sample 1 in a scanning tunneling microscope according to an aspect of the present invention can be realized on all commercially available STMs without the need to modify hardware. In principle, only software modification is sufficient for implementation of this method.

However, additional high frequency actuator, which will manage the high frequency tip-to-sample distance D oscillations, can be helpful as in this case fast tip-to-sample distance D oscillations managed by high frequency actuator will not interfere with slow changes in the tip-to-sample distance caused by feedback and managed by actuators 3 and 6.

Additional processor, which will analyze the TC(D) dependencies in real time, can be useful too. Using such processor, it will not be necessary to record large datasets with TC(t), D(t), $x_{rel}(t)$ and $y_{rel}(t)$ dependencies. In this case only much smaller datasets, with the constant current map 38, the constant height map 39, LDOST map 40 and the potential barrier map 41 coordinates can be recorded.

The invention claimed is:

1. A method of examining a sample in a microscope equipped with at least one scanning tunneling tip, wherein the sample is placed under the tip, wherein tip coordinates $x_{tip}$, $y_{tip}$, $z_{tip}$ are coordinates of the tip in a Cartesian coordinate system with vertical axis (Z) and two horizontal axes X, Y, wherein sample coordinates $x_{sample}$, $y_{sample}$, $z_{sample}$ are coordinates in the same Cartesian coordinate system of an arbitrary spot of the sample, wherein tip-to-sample distance $D=z_{tip}-z_{sample}$ is a difference between tip coordinate $z_{tip}$ along the vertical axis Z and sample coordinate $z_{sample}$ along the vertical axis Z, wherein relative tip-to-sample planar coordinates $x_{rel}=x_{tip}-x_{sample}$ and $y_{rel}=y_{tip}-y_{sample}$ are differences between corresponding tip and sample coordinates along horizontal axes X, Y, and wherein between the tip and the sample tunneling current TC can be detected, comprising carrying out the following steps for at least two surface points of the sample:
    placing the tip successively above said surface points of the sample;
    above each of said surface points of the sample, performing a distance varying step comprising varying the tip-to-sample distance D, and
    concurrently with the distance varying step, performing a time dependencies recording step comprising: recording time dependency TC(t) of the tunneling current TC, recording time dependencies $x_{rel}(t)$, $y_{rel}(t)$ of the relative tip-to-sample planar coordinates $x_{rel}$, $y_{rel}$, and recording time dependency D(t) of the tip-to-sample distance D.

2. The method of claim 1, wherein the tip is placed successively above a plurality of surface points of the sample by scanning movement of the sample and/or of the tip in a horizontal plane and wherein while performing the scanning movement, the distance varying step and the time dependencies recording step are carried out.

3. The method of claim 1, comprising creating a constant current map from the recorded time dependencies TC(t), $x_{rel}(t)$, $y_{rel}(t)$, D(t) for at least two surface points of the sample above which the tip was placed when the tip-to-sample distance D was varied.

4. The method of claim 3, comprising
    determining a constant current CC within the range of the recorded tunneling currents TC;
    finding plurality of values of time t noted as constant current time $t_{CC}$ for which the tunneling current $TC(t_{CC})$ was equal to the constant current CC when recording the time dependency TC(t) of the tunneling current TC, and
    creating the constant current map as a plurality of constant current map points with planar coordinates of each constant current map point equal to relative tip-to-sample planar coordinates $x_{rel}(t_{CC})$, $y_{rel}(t_{CC})$, recorded when time t was equal to one of the constant current times $t_{CC}$, and with space coordinate of each constant current map point equal to tip-to-sample distance $D(t_{CC})$ recorded when time t was equal to one of the constant current times $t_{CC}$, while the horizontal coordinates $x_{rel}(t_{CC})$, $y_{rel}(t_{CC})$ and the space coordinate $D(t_{CC})$ of the same constant current map point have the same constant current time $t_{CC}$.

5. The method of claim 1, comprising creating a constant height map from the recorded time dependencies TC(t), $x_{rel}(t)$, $y_{rel}(t)$, D(t) for at least two surface points of the sample above which the tip was placed when the tip-to-sample distance D was varied.

6. The method of claim 5, comprising
    determining a constant height tip-to-sample distance CH within the range of the recorded tip-to-sample distances D;
    finding plurality of values of time t noted as constant height time $t_{CH}$ for which the tip-to-sample distance $D(t_{CH})$ was equal to the constant height tip-to-sample distance CH when recording the time dependency D(t) of the tip-to-sample distance D;
    creating the constant height map as a plurality of constant height map points wherein planar coordinates of each constant height map point are equal to relative tip-to-sample planar coordinates $x_{rel}(t_{CH})$, $y_{rel}(t_{CH})$ recorded when time t was equal to one of the constant height times $t_{CH}$, and wherein space coordinate of each constant height map point correspond to tunneling currents $TC(t_{CH})$ recorded when time t was equal to one of the values of the constant height time $t_{CH}$, while the planar coordinates and the space coordinate of the same constant height map point have the same constant height time $t_{CH}$.

7. The method of claim 1, comprising creating a Local Density of States Topography map from the recorded time dependencies TC(t), $x_{rel}(t)$, $y_{rel}(t)$, D(t) for at least two surface points of the sample above which the tip was placed when the tip-to-sample distance D was varied.

8. The method of claim 1, comprising creating a potential barrier map from the recorded time dependencies TC(t), $x_{rel}(t)$, $y_{rel}(t)$, D(t) for at least two points of the sample above which the tip was placed when the tip-to-sample distance D was varied.

9. The method of claim 1, comprising carrying out the following sequence of steps for at least two surface points of the sample above which the tip was placed when the tip-to-sample distance D was varied:
    determining a sample surface point specific time interval $<t_1, t_2>$ as a time interval during which the tip remained above this surface point of the sample and
    using the time dependencies TC(t), D(t) recorded during the surface point specific time interval $<t_1, t_2>$ to reconstruct the dependency TC(D) of the tunneling current TC on the tip-to sample distance D for this surface point of the sample, and
    finding a sample height SH and a potential barrier q by fitting the dependency TC(D), obtained for the sample surface point specific time interval $<t_1, t_2>$ by equation:

$$TC(D) = \frac{\gamma\sigma\sqrt{\varphi}V}{D-SH}\exp(-B(D-SH)\sqrt{\varphi}),$$

where $$\gamma = \frac{e\sqrt{2m}}{4\beta\pi^2\hbar^2}, B = 2\beta\sqrt{\frac{2m}{\hbar^2}},$$

β is a dimensionless factor, V is a voltage between the tip and the sample, σ is a tunneling area, m is free electron mass, e is elementary charge, ℏ is Planck's constant.

10. The method of claim 7,
comprising carrying out the following sequence of steps for at least two surface points of the sample above which the tip was placed when the tip-to-sample distance D was varied:
determining a sample surface point specific time interval <$t_1$, $t_2$> as a time interval during which the tip remained above this surface point of the sample and
using the time dependencies TC(t), D(t) recorded during the surface point specific time interval <$t_1$, $t_2$> to reconstruct the dependency TC(D) of the tunneling current TC on the tip-to sample distance D for this surface point of the sample, and
finding a sample height SH and a potential barrier φ by fitting the dependency TC(D), obtained for the sample surface point specific time interval <$t_1$, $t_2$> by equation:

$$TC(D) = \frac{\gamma\sigma\sqrt{\varphi}V}{D-SH}\exp(-B(D-SH)\sqrt{\varphi}),$$

where $$\gamma = \frac{e\sqrt{2m}}{4\beta\pi^2\hbar^2}, B = 2\beta\sqrt{\frac{2m}{\hbar^2}},$$

β is a dimensionless factor, V is a voltage between the tip and the sample, σ is a tunneling area, m is free electron mass, e is elementary charge, ℏ is Planck's constant
wherein the Local Density of States Topography map is created as a plurality of Local Density of States Topography map points, wherein each of the Local Density of States topography map points has planar coordinates $x_{rel}(t)$ and $y_{rel}(t)$ and a space coordinate which corresponds to one of the sample heights SH, wherein for each of Local Density of States Topography map points, time t in $x_{rel}(t)$, $y_{rel}(t)$ is a time arbitrary chosen from one of the sample surface point specific time intervals <$t_1$, $t_2$>, and the sample height SH attributed as a space coordinate to the same Local Density of States Topography map point is retrieved from the dependency TC(D) reconstructed from the time dependencies TC(t), D(t) recorded during the same sample surface point specific time interval <$t_1$, $t_2$>.

11. The method of claim 8,
comprising carrying out the following sequence of steps for at least two surface points of the sample above which the tip was placed when the tip-to-sample distance D was varied:
determining a sample surface point specific time interval <$t_1$, $t_2$> as a time interval during which the tip remained above this surface point of the sample and
using the time dependencies TC(t), D(t) recorded during the surface point specific time interval <$t_1$, $t_2$> to reconstruct the dependency TC(D) of the tunneling current TC on the tip-to sample distance D for this surface point of the sample, and
finding a sample height SH and a potential barrier φ by fitting the dependency TC(D), obtained for the sample surface point specific time interval <$t_1$, $t_2$> by equation:

$$TC(D) = \frac{\gamma\sigma\sqrt{\varphi}V}{D-SH}\exp(-B(D-SH)\sqrt{\varphi}),$$

where $$\gamma = \frac{e\sqrt{2m}}{4\beta\pi^2\hbar^2}, B = 2\beta\sqrt{\frac{2m}{\hbar^2}},$$

β is a dimensionless factor, V is a voltage between the tip and the sample, σ is a tunneling area, m is free electron mass, e is elementary charge, ℏ is Planck's constant
wherein the potential barrier map is created as a plurality of potential barrier map points, wherein each of the potential barrier map points has planar coordinates $x_{rel}(t)$ and $y_{rel}(t)$ and a space coordinate which corresponds to one of the potential barriers φ, wherein for each of potential barrier map points, time t in $x_{rel}(t)$, $y_{rel}(t)$ is a time arbitrary chosen from one of the sample surface point specific time intervals <$t_1$, $t_2$>, and the potential barrier φ attributed as a space coordinate to the same potential barrier map point is retrieved from the dependency TC(D) reconstructed from the time dependencies TC(t), D(t) recorded during the same sample surface point specific time interval <$t_1$, $t_2$>.

12. The method of claim 1, wherein a setpoint tunneling current $S_{TC}$ is determined as the highest allowable tunneling current.

13. The method of claim 12, wherein a preliminary approach (32) between the tip and the sample is carried out before performing the distance varying step for the first time, said preliminary approach being stopped when the tunneling current TC reaches the value of the setpoint tunneling current $S_{TC}$.

14. The method of claim 1, wherein a setpoint tip-to-sample distance $S_D(t)$ is set as a distance between the tip 4 and the sample when TC(t)=$S_{TC}$ and wherein varying the tip-to-sample distance D comprises setting the amplitude A of the tip-to-sample distance D variation and then repeatedly decreasing and increasing the tip-to-sample distance D between the setpoint tip-to-sample distance $S_D(t)$ and the setpoint tip-to-sample distance $S_D(t)$ plus twice the amplitude A.

15. The method of claim 14, wherein the amplitude A falls in the range of 100 pm to 10 nm.

16. The method of claim 1, wherein a frequency f is set and the tip-to-sample distance D is varied with said frequency f.

17. The method of claim 16, wherein the frequency f falls in the range of 1 kHz to 1000 kHz.

18. The method of claim 12, wherein to avoid collision between the tip and the sample, a protective feedback regime is set up so that when the tunneling current TC becomes greater than the setpoint tunneling current $S_{TC}$, the tip-to-sample distance D is extended.

* * * * *